United States Patent [19]

Bist

[11] Patent Number: 6,111,914
[45] Date of Patent: Aug. 29, 2000

[54] ADAPTIVE ENTROPY CODING IN ADAPTIVE QUANTIZATION FRAMEWORK FOR VIDEO SIGNAL CODING SYSTEMS AND PROCESSES

[75] Inventor: Anurag Bist, Irvine, Calif.

[73] Assignee: Conexant Systems, Inc., Newport Beach, Calif.

[21] Appl. No.: 08/980,654

[22] Filed: Dec. 1, 1997

[51] Int. Cl.[7] .................................................. H04N 7/24
[52] U.S. Cl. .......................................... 375/240; 348/405
[58] Field of Search ..................................... 348/384, 390, 348/396, 405, 409–412, 415, 419; 382/232, 236, 238, 251; 341/67; 375/240; H04N 7/32, 7/24

[56] References Cited

U.S. PATENT DOCUMENTS

| | | | |
|---|---|---|---|
| 4,716,453 | 12/1987 | Pawelski | 348/396 |
| 5,231,484 | 7/1993 | Gonzales et al. | 348/405 |
| 5,416,604 | 5/1995 | Park | 348/384 |
| 5,475,502 | 12/1995 | Lee et al. | 348/384 |
| 5,585,853 | 12/1996 | Juri et al. | 348/405 |
| 5,724,453 | 3/1998 | Ratnakar et al. | 348/405 |
| 5,745,504 | 4/1998 | Bang | 341/67 |
| 5,754,236 | 5/1998 | Lee | 348/415 |
| 5,821,887 | 10/1998 | Zhu | 341/67 |
| 5,933,193 | 8/1999 | Niesen | 348/405 |

FOREIGN PATENT DOCUMENTS

| | | |
|---|---|---|
| 574 746 A1 | 5/1993 | European Pat. Off. . |
| 575 113 A2 | 6/1993 | European Pat. Off. . |
| 859 520 A1 | 2/1998 | European Pat. Off. . |
| WO 96 34496 | 4/1996 | WIPO . |

OTHER PUBLICATIONS

Siu–Wai Wu and Allen Gersho, Rate–Constrained Optimal Block–Adaptive Coding for Digital Tape Recording of HDTV, IEEE Transactions on Circuits and Systems for Vidoe Technology, vol. 1 No. 1, Mar. 1, 1991, pp. 100–112, 160–161–162, XP000208644.

Guido M. Schuster et al. Fast and Efficient Mode and Quantizer Selection in the Rate Distortion Sense for H.263, Proceedings of the SPIE, vol. 2727, No. Part 02, Mar. 17, 1996, pp. 784–795, XP000617893.

Guido M. Shuster, Optimal Decomposition for Quad–Trees With Leaf Dependencies, Visual Communication and Image Processing '97, San Jose, CA, USA Feb. 12–14, 1997, vol. 1 3024, pt. 1, pp. 59–70, XP002098297 ISSN 0277–786X, Proceedings of the SPIE—The International Society for Optical Engineering, 1997, SPIE–Int. Soc. Opt. Eng, USA.

Anurag Bist et al., Constrained Trellis Based Rate Control Scheme for Low Bit Rate Video Coding, Proceedings of the International Conference on Image Processing, (IC, Lausanne, Sep. 16–19, 1996, vol. 2, Sep. 16, 1996, pp. 61–64, XP002067812, Institute of Electrical and Electronic Engineers).

Antonio Ortega et al., Optimal Buffer–Constrained Source Quantization and Fast Approximations, Proceedings of the International Symposium on Circuits and Systems, San Diego, May 10–13, 1992, vol. 1, No. Conf. 25, 1992, pp. 192–195, XP000606116, Institute of Electrical and Electronic Engineers.

(List continued on next page.)

*Primary Examiner*—Richard Lee
*Attorney, Agent, or Firm*—Price Gess & Ubell

[57] ABSTRACT

A compression system and process include adaptive quantization for selection of one quantizer, for each video frame or frame portion, from a group of quantizers, where each quantizer is a set of predefined quantizer values, and coding of the quantized values using a common entropy coding table for all quantizers, or a separate entropy coding table for each quantizer. The entropy coding tables are obtained during a training procedure. The selection of the quantizer is based on a formula which takes into account the distortion and bit rate characteristics of each quantizer. A similar formula, based on the distortion and bit rate characteristics, is used to select the particular quantizer value within the chosen quantizer for each video signal value being coded.

18 Claims, 9 Drawing Sheets

OTHER PUBLICATIONS

Wim Coene et al., A Fast Route for Applications of Rate–Distortion Optimal Quantization in an MPEG Video Encoder, Proceedings of the International Conference on Image Processing, (IC Lausanne, Sep. 16–19, 1996, vol. 2. Sep. 16, 1996, pp. 825–828, XP000733350, Institute of Electrical and Electronic Engineers).

Matthew Crouse, Joint Thresholding and Quantization Selection for Decoder–Compatible Baseline JPEG, Proceedings of the International Conference on Acoustics, Speech, and Signal Processing (ICASSP). Detroit, May 9–12, 1995 Image and Multi–dimensional Signal Processing/Signal Processing Application Development, vol. 4, No. Conf. 20, May 9, 1995, pp. 2331–2334, XP000535417, Institute of Electrical and Electronic Engineers.

| INDEX | LAST | RUN | LEVEL | BITS | VLC CODE | INDEX | LAST | RUN | LEVEL | BITS | VLC CODE |
|---|---|---|---|---|---|---|---|---|---|---|---|
| 0 | 0 | 0 | 1 | 3 | 10 | 58 | 1 | 0 | 1 | 5 | 0111 |
| 1 | 0 | 0 | 2 | 5 | 1111 | 59 | 1 | 0 | 2 | 10 | 0000 11001 |
| 2 | 0 | 0 | 3 | 7 | 010101 | 60 | 1 | 0 | 3 | 12 | 0000 0000 101 |
| 3 | 0 | 0 | 4 | 8 | 0010 111 | 61 | 1 | 1 | 1 | 7 | 0011 11 |
| 4 | 0 | 0 | 5 | 9 | 0001 1111 | 62 | 1 | 1 | 2 | 12 | 0000 0000 100 |
| 5 | 0 | 0 | 6 | 10 | 0001 00101 | 63 | 1 | 2 | 1 | 7 | 0011 10 |
| 6 | 0 | 0 | 7 | 10 | 0001 00100 | 64 | 1 | 3 | 1 | 7 | 0011 01 |
| 7 | 0 | 0 | 8 | 11 | 00001 000 01 | 65 | 1 | 4 | 1 | 7 | 0011 00 |
| 8 | 0 | 0 | 9 | 11 | 00001 000 00 | 66 | 1 | 5 | 1 | 8 | 0010 011 |
| 9 | 0 | 0 | 10 | 12 | 0000 0000 111 | 67 | 1 | 6 | 1 | 8 | 0010 010 |
| 10 | 0 | 0 | 11 | 12 | 0000 0000 110 | 68 | 1 | 7 | 1 | 8 | 0010 001 |
| 11 | 0 | 0 | 12 | 12 | 0000 0100 000 | 69 | 1 | 8 | 1 | 8 | 0010 000 |
| 12 | 0 | 1 | 1 | 4 | 110 | 70 | 1 | 9 | 1 | 9 | 0001 1010 |
| 13 | 0 | 1 | 2 | 7 | 01010 0 | 71 | 1 | 10 | 1 | 9 | 0001 1001 |
| 14 | 0 | 1 | 3 | 9 | 0001 1110 | 72 | 1 | 11 | 1 | 9 | 0001 1000 |
| 15 | 0 | 1 | 4 | 11 | 0000 0011 11 | 73 | 1 | 12 | 1 | 9 | 0001 0111 |
| 16 | 0 | 1 | 5 | 12 | 0000 0100 001 | 74 | 1 | 13 | 1 | 9 | 0001 0110 |
| 17 | 0 | 1 | 6 | 13 | 0000 0101 0000 | 75 | 1 | 14 | 1 | 9 | 0001 0101 |
| 18 | 0 | 2 | 1 | 5 | 1110 | 76 | 1 | 15 | 1 | 9 | 0001 0100 |
| 19 | 0 | 2 | 2 | 9 | 0001 1101 | 77 | 1 | 16 | 1 | 9 | 0001 0011 |
| 20 | 0 | 2 | 3 | 11 | 0000 0011 10 | 78 | 1 | 17 | 1 | 10 | 0000 1100 |
| 21 | 0 | 2 | 4 | 13 | 0000 0101 0001 | 79 | 1 | 18 | 1 | 10 | 0000 1011 1 |
| 22 | 0 | 3 | 1 | 6 | 01101 | 80 | 1 | 19 | 1 | 10 | 0000 1011 0 |
| 23 | 0 | 3 | 2 | 10 | 0001 00011 | 81 | 1 | 20 | 1 | 10 | 0000 10101 |
| 24 | 0 | 3 | 3 | 11 | 0000001101 | 82 | 1 | 21 | 1 | 10 | 0000 10100 |
| 25 | 0 | 4 | 1 | 6 | 0110 0 | 83 | 1 | 22 | 1 | 10 | 0000 1001 1 |
| 26 | 0 | 4 | 2 | 10 | 0001 00010 | 84 | 1 | 23 | 1 | 10 | 0000 1001 0 |
| 27 | 0 | 4 | 3 | 13 | 0000 0101 0010 | 85 | 1 | 24 | 1 | 10 | 0000 1000 1 |
| 28 | 0 | 5 | 1 | 6 | 0101 1 | 86 | 1 | 25 | 1 | 11 | 0000 0001 11 |
| 29 | 0 | 5 | 2 | 11 | 0000 0011 00 | 87 | 1 | 26 | 1 | 11 | 0000 0001 10 |
| 30 | 0 | 5 | 3 | 13 | 0000 0101 0011 | 88 | 1 | 27 | 1 | 11 | 0000 0001 01 |
| 31 | 0 | 6 | 1 | 7 | 01001 1 | 89 | 1 | 28 | 1 | 11 | 0000 0001 00 |
| 32 | 0 | 6 | 2 | 11 | 0000 0010 11 | 90 | 1 | 29 | 1 | 12 | 0000 0100 100 |

FIG. 5a
PRIOR ART

| INDEX | LAST | RUN | LEVEL | BITS | VLC CODE |
|---|---|---|---|---|---|
| 33 | 0 | 6 | 3 | 13 | 0000 0101 0100 |
| 34 | 0 | 7 | 1 | 7 | 0100 10 |
| 35 | 0 | 7 | 2 | 11 | 0000 0010 10 |
| 36 | 0 | 8 | 1 | 7 | 0100 01 |
| 37 | 0 | 8 | 2 | 11 | 0000 0010 01 |
| 38 | 0 | 9 | 1 | 7 | 0100 00 |
| 39 | 0 | 9 | 2 | 11 | 0000 0010 00 |
| 40 | 0 | 10 | 1 | 8 | 0010 110 |
| 41 | 0 | 10 | 2 | 13 | 0000 0101 0101 |
| 42 | 0 | 11 | 1 | 8 | 0010 101 |
| 43 | 0 | 12 | 1 | 8 | 0010 100 |
| 44 | 0 | 13 | 1 | 9 | 0001 1100 |
| 45 | 0 | 14 | 1 | 9 | 0001 1011 |
| 46 | 0 | 15 | 1 | 10 | 0001 0000 1 |
| 47 | 0 | 16 | 1 | 10 | 0001 0000 0 |
| 48 | 0 | 17 | 1 | 10 | 0000 1111 1 |
| 49 | 0 | 18 | 1 | 10 | 0000 1111 0 |
| 50 | 0 | 19 | 1 | 10 | 0000 1110 1 |
| 51 | 0 | 20 | 1 | 10 | 0000 1110 0 |
| 52 | 0 | 21 | 1 | 10 | 0000 1101 1 |
| 53 | 0 | 22 | 1 | 10 | 0000 1101 0 |
| 54 | 0 | 23 | 1 | 12 | 0000 0100 010 |
| 55 | 0 | 24 | 1 | 12 | 0000 0100 011 |
| 56 | 0 | 25 | 1 | 13 | 0000 0101 0110 |
| 57 | 0 | 26 | 1 | 13 | 0000 0101 0111 |

| INDEX | LAST | RUN | LEVEL | BITS | VLC CODE |
|---|---|---|---|---|---|
| 91 | 1 | 30 | 1 | 12 | 0000 0100 101 |
| 92 | 1 | 31 | 1 | 12 | 0000 0100 110 |
| 93 | 1 | 32 | 1 | 12 | 0000 0100 111 |
| 94 | 1 | 33 | 1 | 13 | 0000 0101 1000 |
| 95 | 1 | 34 | 1 | 13 | 0000 0101 1001 |
| 96 | 1 | 35 | 1 | 13 | 0000 0101 1010 |
| 97 | 1 | 36 | 1 | 13 | 0000 0101 1011 |
| 98 | 1 | 37 | 1 | 13 | 0000 0101 1100 |
| 99 | 1 | 38 | 1 | 13 | 0000 0101 1101 |
| 100 | 1 | 39 | 1 | 13 | 0000 0101 1110 |
| 101 | 1 | 40 | 1 | 13 | 0000 0101 1111 |
| 102 | ESCAPE | | | 7 | 0000 011 |

*FIG. 5b*
PRIOR ART

|     | L=1 | L=2 | L=3 | L=4 | L=5 | L=6 | L=7 | L=8 | L=9 | 10  | 11  | 12  |
| --- | --- | --- | --- | --- | --- | --- | --- | --- | --- | --- | --- | --- |
| R=1 | 1   | 3   | 5   | 5   | 6   | 7   | 8   | 8   | 9   | 9   | 11  | 11  |
| 2   | 2   | 6   | 7   | 8   | 10  | 10  | 9   | 10  | 10  | 11  | Esc | Esc |
| 3   | 3   | 8   | 9   | 11  | 15  | Esc | 15  | Esc | Esc | Esc | Esc | Esc |
| 4   | 4   | 8   | 10  | 12  | 11  | 15  | 15  | Esc | Esc | Esc | Esc | Esc |
| 5   | 4   | 9   | 10  | Esc | 13  | Esc | Esc | Esc | Esc | Esc | Esc | Esc |
| 6   | 5   | 9   | 12  | 13  | Esc | Esc | Esc | Esc | Esc | Esc | Esc | Esc |
| 7   | 5   | 11  | 14  | Esc | Esc | Esc | Esc | Esc | 14  | Esc | Esc | Esc |
| 8   | 5   | 9   | 10  | 15  | Esc | Esc | Esc | Esc | Esc | Esc | Esc | Esc |
| 9   | 5   | 11  | 13  | 12  | Esc | Esc | Esc | Esc | Esc | Esc | Esc | Esc |
| 10  | 6   | 15  | 15  | 14  | Esc | Esc | Esc | Esc | Esc | Esc | Esc | Esc |
| 11  | 6   | Esc | Esc | Esc | Esc | Esc | Esc | Esc | Esc | Esc | Esc | Esc |
| 12  | 7   | 12  | 14  | Esc | Esc | Esc | Esc | Esc | Esc | Esc | Esc | Esc |
| 13  | 7   | Esc | Esc | Esc | Esc | Esc | Esc | Esc | Esc | Esc | Esc | Esc |
| 14  | 7   | 14  | Esc | Esc | Esc | Esc | Esc | Esc | Esc | Esc | Esc | Esc |
| 15  | 8   | Esc | Esc | Esc | Esc | Esc | Esc | Esc | Esc | Esc | Esc | Esc |
| 16  | 8   | Esc | Esc | Esc | Esc | Esc | Esc | Esc | Esc | Esc | Esc | Esc |
| 17  | 9   | 15  | Esc | Esc | Esc | Esc | Esc | Esc | Esc | Esc | Esc | Esc |
| 18  | 9   | Esc | Esc | Esc | Esc | Esc | Esc | Esc | Esc | Esc | Esc | Esc |
| 19  | 9   | Esc | Esc | Esc | Esc | Esc | Esc | Esc | Esc | Esc | Esc | Esc |
| 20  | 9   | Esc | Esc | Esc | Esc | Esc | Esc | Esc | Esc | Esc | Esc | Esc |
| 21  | 10  | Esc | Esc | Esc | Esc | Esc | Esc | Esc | Esc | Esc | Esc | Esc |
| 22  | 10  | Esc | Esc | Esc | Esc | Esc | Esc | Esc | Esc | Esc | Esc | Esc |
| 23  | 12  | Esc | Esc | Esc | Esc | Esc | Esc | Esc | Esc | Esc | Esc | Esc |
| 24  | 10  | Esc | Esc | Esc | Esc | Esc | Esc | Esc | Esc | Esc | Esc | Esc |
| 25  | 10  | Esc | Esc | Esc | Esc | Esc | Esc | Esc | Esc | Esc | Esc | Esc |
| 26  | 11  | Esc | Esc | Esc | Esc | Esc | Esc | Esc | Esc | Esc | Esc | Esc |
| 27  | 12  | Esc | Esc | Esc | Esc | Esc | Esc | Esc | Esc | Esc | Esc | Esc |

FIG. 6

|  | LEVEL=1 | LEVEL=2 | LEVEL=3 |
| --- | --- | --- | --- |
| RUN= 1 | 2 | 7 | 6 |
| RUN= 2 | 3 | 8 | 7 |
| RUN= 3 | 3 | 9 | 13 |
| RUN= 4 | 4 | 13 | 12 |
| RUN= 5 | 4 | Esc | 12 |
| RUN= 6 | 4 | Esc | 13 |
| RUN= 7 | 4 | Esc | Esc |
| RUN= 8 | 4 | Esc | Esc |
| RUN= 9 | 5 | Esc | Esc |
| RUN= 10 | 5 | Esc | Esc |
| RUN= 11 | 5 | Esc | 13 |
| RUN= 12 | 5 | 11 | Esc |
| RUN= 13 | 5 | 13 | Esc |
| RUN= 14 | 6 | Esc | Esc |
| RUN= 15 | 6 | Esc | Esc |
| RUN= 16 | 6 | Esc | Esc |
| RUN= 17 | 6 | Esc | Esc |
| RUN= 18 | 7 | Esc | Esc |
| RUN= 19 | 6 | Esc | Esc |
| RUN= 20 | 7 | Esc | Esc |
| RUN= 21 | 8 | Esc | Esc |
| RUN= 22 | 7 | Esc | Esc |
| RUN= 23 | 8 | Esc | Esc |
| RUN= 24 | 7 | Esc | Esc |
| RUN= 25 | 7 | Esc | Esc |
| RUN= 26 | 7 | Esc | Esc |
| RUN= 27 | 8 | Esc | Esc |
| RUN= 28 | 8 | Esc | Esc |
| RUN= 29 | 8 | Esc | Esc |
| RUN= 30 | 9 | Esc | Esc |
| RUN= 31 | 8 | Esc | Esc |
| RUN= 32 | 9 | Esc | Esc |
| RUN= 33 | 9 | Esc | Esc |
| RUN= 34 | 8 | Esc | Esc |
| RUN= 35 | 10 | Esc | Esc |
| RUN= 36 | 9 | Esc | Esc |
| RUN= 37 | 10 | Esc | Esc |
| RUN= 38 | 9 | Esc | Esc |
| RUN= 39 | 9 | Esc | Esc |
| RUN= 40 | 8 | Esc | Esc |
| RUN= 41 | 9 | Esc | Esc |

FIG. 7

| 119 | 50 | 45 | 23 | 2 | 1 | 2 | 3 |
|---|---|---|---|---|---|---|---|
| 59 | 66 | 20 | 0 | 3 | 0 | 3 | 2 |
| 23 | 2 | 2 | 3 | 3 | 1 | 1 | 2 |
| 1 | 2 | 3 | 2 | 1 | 2 | 2 | 3 |
| 1 | 2 | 3 | 3 | 3 | 3 | 3 | 0 |
| 1 | 0 | 6 | 0 | 0 | 4 | 0 | 0 |
| 1 | 0 | 0 | 0 | 0 | 0 | 0 | 0 |
| 1 | 0 | 0 | 0 | 0 | 0 | 0 | 0 |

FIG. 8

| 3 | 1 | 1 | 0 | 0 | 0 | 0 | 0 |
|---|---|---|---|---|---|---|---|
| 2 | 2 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

FIG. 9

| 3 | 1 | 2 | 0 | 2 | 1 | 0 | 0 |
|---|---|---|---|---|---|---|---|
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

FIG. 10

ADAPTIVE ENTROPY CODING IN ADAPTIVE QUANTIZATION FRAMEWORK FOR VIDEO SIGNAL CODING SYSTEMS AND PROCESSES

BACKGROUND OF THE INVENTION

1. Field of the Invention

The present invention relates to devices and methods for coding video signals and more specifically to the coding using adaptive quantization with multiple quantizers and variable length code (VLC) tables. These devices and data compression methods can be readily adapted for H.263+ and MPEG-4 video standards.

2. Description of Related Art

Video signals generally include data corresponding to one or more video frames, where each video frame is composed of an array of picture elements (pels). A typical color video frame can be of a variety of resolutions, one of which is the quarter common interface format (QCIF) resolution represented in FIG. 1, where a video frame is composed of over twenty-five thousand picture elements, arranged in an array of 144 pels×176 pels, and divided in 8×8 pel blocks. Since each pel has to be characterized with a color (or hue) and luminance characteristics, these data may be represented with groups of four luminance pel blocks or two chrominance pel blocks called macroblocks. Thus, digital signals representing a sequence of video frame data, usually containing many video frames, have a large number of bits. However, the available storage space and bandwidth for transmitting such signals is limited. Therefore, compression (coding) processes are used to more efficiently transmit or store video data.

Compression of digital video signals for transmission or for storage has become widely practiced in a variety of contexts, especially in multimedia environments for video conferencing, video games, internet image transmissions, digital TV and the like. Coding and decoding is accomplished with coding processors which may be general computers, special hardware or multimedia boards and other suitable processing devices. Standards for compression processes have been developed by the International Telecommunication Union (ITU), which has developed H series standards used for real-time communications such as in videophones, and the International Organization for Standardization (ISO) which has developed the Motion Picture Experts Group (MPEG) series standards, such as MPEG-1, MPEG-2, MPEG-4 and MPEG-7.

Coding operations for video signals are typically performed with smaller samples of the video frame, such as the 16×16 pel sample composed of four 8×8 pel blocks shown in broken lines in FIG. 1. Compression processes typically involve quantization, in which sampled video signal data values, like color and luminance, are represented by, or are mapped onto, a fixed number of predefined quantizer values. The quantized signal is composed of quantizer values that are, in fact, approximations of the sampled video signal values. Therefore, the encoding of the video signal data onto a limited number of quantizer values necessarily produces some loss in accuracy and distortion of the signal after decoding process.

Improvements in accuracy and distortion may be made by designing the quantizer set to include those quantizer values that have been found by experimentation to have the highest probability of being selected. However, the quantizer values that have the highest selection probability in one portion of a video frame are typically different from the quantizer values that have the highest selection probability in another portion of the frame, and, in a moving video context, such values differ from frame to frame as well.

A compression process of an input signal I, according to the H.263 and MPEG-4 standards, is generally represented by FIG. 2 for Intra blocks and by FIG. 3 for Inter blocks, and involves a discrete cosine transform (DCT) step 12, a quantization step 16, and a variable length coding step 18. Compressed and coded input video data signal is then transmitted on a fixed bandwidth communication link to a receiver (not shown). For Inter blocks, the process shown in FIG. 2 includes an additional motion compensation step 11, carried out prior to the DCT step 12. The motion compensation step 11 involves the summing operation in which a displaced block from a previous frame using motion vector from motion estimation is subtracted from the input video data signal I for a block, to provide a motion compensated difference block as the input to the DCT step 12.

In FIGS. 2 and 3, the DCT step 12 is performed on the signal components associated with the luminance and color values for each processing sample block and provides an output for each block, representing components of each pel of a block as values within a defined range. The range of an output block may be, for example, (−2048,+2048), with the higher values typically positioned toward the top left corner of each block and the values decreasing in the direction of arrow 14 toward the lower right corner of each block.

In the quantization step 16, each DCT value in the block is mapped to a value within a fixed set of quantizer values, based on a quantization scheme. As discussed in more detail below, a preferred quantization scheme in accordance with H.263+ and MPEG-4 video standards involves a step of calculating new values for luminance and color components of each pel of a block. Following the calculation step, a selecting step is carried out, in which approximate values are selected from predefined quantizer values closest to the original input signal values.

In most low bit rate video coding schemes, a calculation step for calculating new values Y' in the quantization process involves a number of calculations to determine a level for Y data value of each pel in the block, using the following equation:

$$\text{level} = INT[(Y + \text{offset})/2QP]$$

where INT is the integer value of the equation.

Y could be a value of luminance or color, offset is preferably −QP/2, and QP is a quantization coefficient representing quantization step size, preferably selected from the range $1 \leq QP \leq 31$. The QP value is determined using well known linear bit rate control techniques and it depends on the number of bits allowed by the bit constraints of the system and on the desired image quality.

From the calculated level for each pel, a Y' value is determined, using the following equation:

$$Y' = (2QP \times \text{level}) + QP$$

In this manner, a Y' value is calculated for each Y value in the block and each Y' value is a multiple of QP, based on the corresponding Y value.

In typical quantization systems, in accordance with the H.263 and MPEG-4 standards, the Y' value is used for selecting a quantizer value from a set of quantizer values represented by the standard quantizer $R_0$, where each quantizer value is a multiple of QP. The standard quantizer $R_0$ is defined as follows:

$$R_0 \epsilon \{0, \pm 3QP, \pm 5QP, \pm 7QP, \ldots\}$$

Each Y' value is mapped onto the closest quantizer value selected from the set $R_0$ and, thus, each block of Y values is mapped to a corresponding block of quantizer values.

For example, if the Y value for a particular pel is +110 and the selected QP value is 20, then the above equations would render the following values:

$$\text{offset} = -QP/2 = -10$$

$$\text{level} = INT[(Y+\text{offset})/2QP] = INT[2.5] = 2$$

$$Y' = (2QP) \times \text{level} + QP = 40 \times 2 + 20 = 100 = 5QP$$

If the value of Y is chosen to be within the range $-2048 \leq Y \leq 2048$, then the quantizer $R_0$ of estimated Y' values must have a QP-multiple which represents the lowest possible value (−2048) as well as the highest possible value (2048). Using the standard QP-multiples set $R_0$, the quantizer $R_0$ would have to extend to ±101 QP and is represented as follows:

$$R_0 \epsilon \{0, \pm 3QP, \pm 5QP, \pm 7QP, \ldots \pm 101QP, \ldots \pm 255QP\}$$

The calculated Y' value of 5QP happens to be identical to a QP-multiple value within the set: $\{0, \pm 3QP, \pm 5QP, \pm 7QP, \ldots \pm 101QP, \ldots \pm 255QP\}$. In this example the values above ±110 are not used and the Y value 110 of the pel was mapped to the Y' value 5QP. However, the accuracy of the coded information suffers to some extent, as illustrated by the fact that the Y' value of 100 differs from the original Y value of 110 by almost 10% of the Y value.

In the second example, with the same Y value of 110, as above, but with the QP value of 2:

$$\text{level} = [(110-2/2)/2(2)] = [27.25] = 27$$

and $$Y' = 2(2) \times 27 + 2 = 110 = 55QP.$$

Thus, in the second example, the Y value 110 of the pel was mapped to the Y' value of 55QP and the calculated Y' value of 110 is equal to the original Y value.

With the relatively low QP value of 2 the number of possible QP-multiples is significantly greater than in the first example. In particular, with $-2048 \leq Y \leq +2048$ and with QP=2, the standard quantizer $R_0$ of possible Y' values uses the values up to +255QP, as follows: $\{0, \pm 3QP, \pm 5QP, \pm 7QP, \ldots \pm 255QP\}$. Thus, with the QP value of 2, the number of possible Y' values is increased with respect to the first example, in which the QP value was 20. Accordingly, the accuracy of the Y' value is greater in the second example than in the first example.

The number of bits required to code the possible Y' value is a function of the absolute value of the input signal I, and the higher the magnitude of the signal, the more bits it would take to represent the possible Y' values. Because 27 is significantly greater than 2, the number of bits needed to code the possible Y' value is greater in the second than in the first example. Therefore, the QP value should be selected based on the number of bits that can be transmitted over the transmission channel and the desired image quality, because more accurate coding (mapping) of pel values occurs with lower QP values. thus, lower QP values may be used with certain portions of the video frame in which higher accuracy is desired, such as portions of the frame in which movement occurs, than in the other portions of the frame. Also, different QP values could be used for luminance and chrominance blocks.

As a result of the DCT step 12, the Y' values toward the lower right corner of the block will tend to be small and, if QP is high enough, the Y' values for many of the pels toward that corner will be zero, as it is shown in FIG. 4, where an "x" represents a value other than zero and "0" represents a value of zero.

After the quantization step 16, the pel values in the block are coded using a variable length coding 18 step with a suitable entropy coding scheme, such as Huffman coding. Huffman coding is preferred because of its low cost, high accuracy and efficiency. With this coding the pel values can be coded with a relatively short binary code sequence and the strings of zeroes (called Runs), which tend to occur toward the lower right corner of the quantized block, are coded together with the code for the next pel in one binary string. The efficiency can be further enhanced by coding the data for each pel in the zig-zag sequence, represented by the arrow 20 in FIG. 4.

At the receiver end, the Huffman-coded transmission is decoded to obtain the reconstructed values for the coded block of Y' values. Afterwards, calculations reversing the above-discussed calculations are performed on the Y' values to obtain representations of the original Y values. A VLC table used for the encoding and decoding in the H.263+ standard is given in FIGS. 5a and 5b.

OBJECTS AND SUMMARY OF THE INVENTION

It is an object of the present invention to provide an improved compression system and method which are capable of providing improved accuracy with less distortion and/or improved bit rate characteristics.

It is a further object of the invention to provide such a system and method which adapt to the statistical changes of the imagery in a video signal while maintaining the basic structure of the quantization processes of H 263+and MPEG-4 standards.

These and other objects are achieved, according to the preferred embodiments, with a system and process for coding video signals employing an adaptive quantization scheme for quantizing the sampled data values by correlating each sampled data value to a value selected from a predefined set $R_x$ of quantizer values. The quantizer values are multiples of a quantization coefficient QP, and the quantizer set is chosen from a group $R_0$–$R_n$ of quantizer sets based on a distortion and bit rate characteristics of each quantizer value in the set $R_x$. At least one VLC table, having an entry for each pel event with a high probability of occurrence, is selected and the quantizer values are coded with a variable length adaptive entropy coding method using the VLC table. The VLC table is obtained in a training procedure using a training signal; based on a probability of occurrence of each event from the total number of occurrences of the event in the training signal. The training procedure may use several VLC tables, one for each quantizer Rx, for improved efficiency.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

FIGS. 5a and 5b are representations of the VLC table used in H.263+ standard;

FIG. 6 is a representation of a table showing lengths of binary codes for non-last events, in an optimized 3-D VLC table obtained using the adaptive entropy coding of the present invention;

FIG. 7 is a representation of a table showing the lengths of binary codes for last events, in an optimized 3-D VLC table obtained using the adaptive entropy coding of the present invention;

FIG. 8 is a representation of a table showing pel values of an 8×8 input block;

FIG. 9 is a representation of a table showing a quantized block which corresponds to the input block of FIG. 8.

FIG. 10 is a representation of a table showing a block which corresponds to the quantized and scanned input block of FIG. 8.

DETAILED DESCRIPTION OF THE PREFERRED EMBODIMENTS

Figure 1:
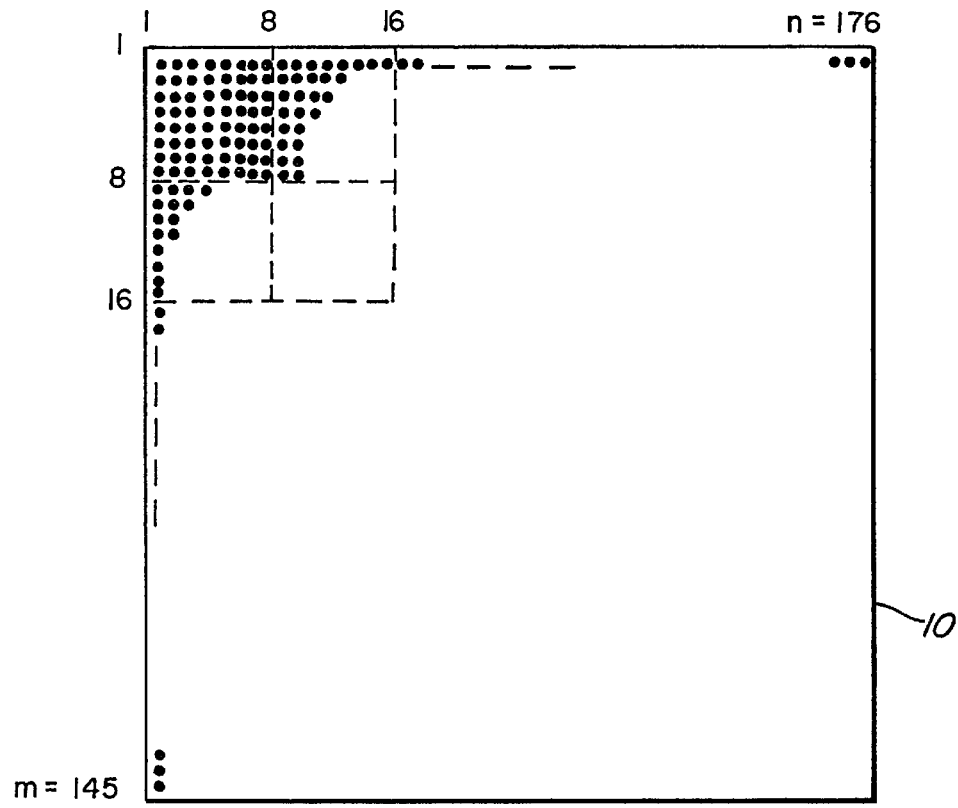
FIG. 1 is a representation of a typical video frame.
Figure 4:
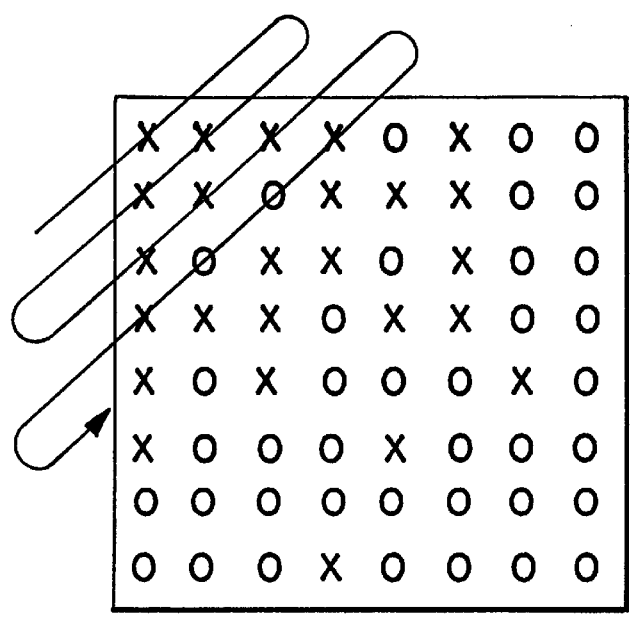
FIG. 4 is a representation of an 8×8 pel block of a video frame, after the DCT and quantization steps of the process shown in FIG. 2.
Figure 2:
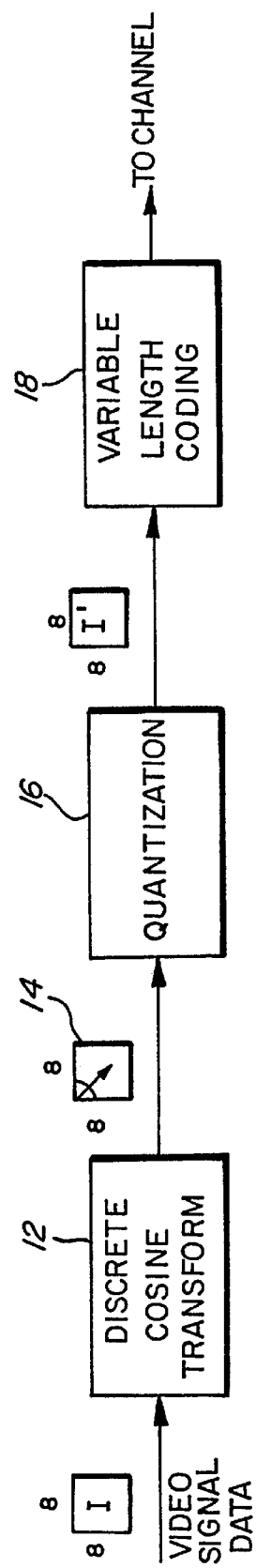
FIG. 2 is a block diagram representing a compression process for coding video signal data for Intra blocks.
Figure 3:
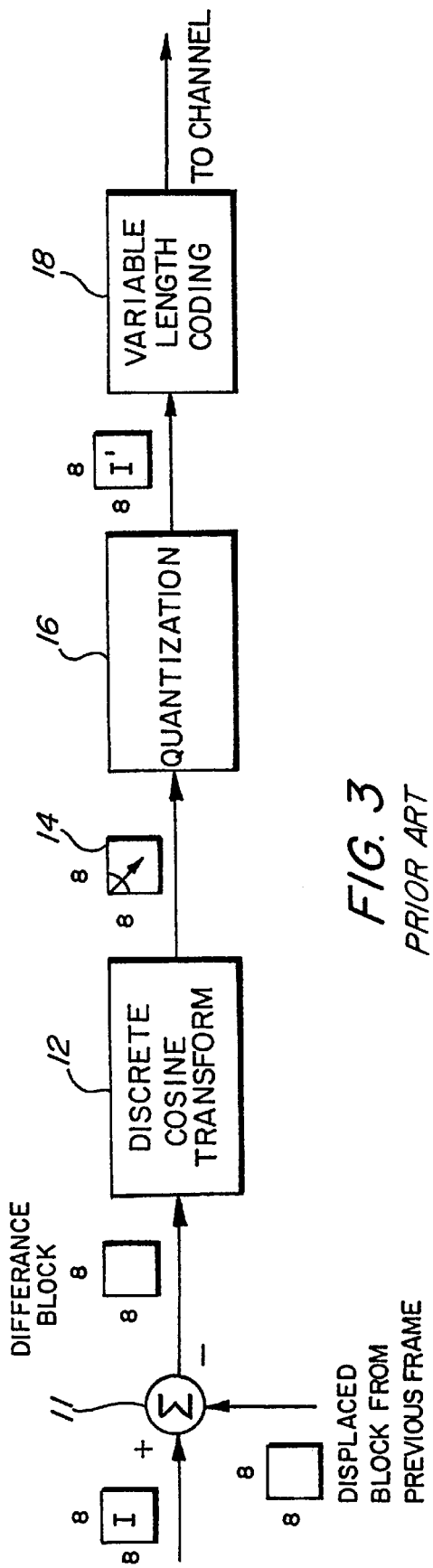
FIG. 3 is a block diagram representing a compression process for coding video signal data for Inter blocks.

The following detailed description is of the best presently contemplated mode of carrying out the invention. This description is not to be taken in a limiting sense, but is made merely for the purpose of illustrating general principles of embodiments of the invention. The scope of the invention is best defined by the appended claims.

Conventional coding systems, employing current H.263+ and MPEG-4 video standards, do not have the ability to change quantizers values to adapt to the changes in the input signal because there is only one quantizer $R_0$.

In a preferred embodiment of the present invention a method is proposed where the quantization for each frame or, more preferably, for each frame portion, is carried out in the quantization step 16 by selecting the most appropriate quantizer from a group of predefined quantizers $R_0$–$R_n$. In this manner, the system or process is capable of changing to a different quantizer for different video frame or, preferably, for different portion of the same frame to achieve higher degree of accuracy and a lower bit rate. This method is partially described in the copending U.S. patent application Ser. No. 08/799,995, filed on Feb. 13, 1997 by the same inventor entitled "Video Signal Coding Systems and processes Using Adaptive Quantization,".

The quantizer selection is based on a determination of which quantizer provides the best distortion and bit rate characteristics for the portion of the video signal being coded. The selection is based on a formula which takes into account both the distortion and bit rate. A similar formula, based on both distortion and bit rate characteristics, is used to select the particular quantizer value within the quantizer for each video signal value being coded.

Multiple quantizers $R_0$–$R_n$, each having a set of quantizer values that are most likely to closely estimate the actual video signal values, are derived by experimentation. Different sets may be derived for different QP values.

For example, the U.S. patent application with Ser. No. 08/799,995 proposes the following group of quantizers $R_0$–$R_n$ for quantization step QP:

$R_0 = \{0, \pm 3QP, \pm 5QP, \pm 7QP, \ldots \pm 255QP\}$ $R_1 = \{0, \pm 3QP, \pm 6QP, \pm 7QP, \ldots \pm 255QP\}$ $R_2 = \{0, \pm 3QP, \pm 4QP, \pm 7QP, \ldots \pm 255QP\}$ $R_3 = \{0, \pm 2QP, \pm 6QP, \pm 7QP, \ldots \pm 255QP\}$ $R_4 = \{0, \pm 2QP, \pm 5QP, \pm 7QP, \ldots \pm 255QP\}$ $R_5 = \{0, \pm 2QP, \pm 4QP, \pm 7QP, \ldots \pm 255QP\}$ $R_6 = \{0, \pm 2QP, \pm 3QP, \pm 7QP, \ldots \pm 255QP\}$ $R_7 = \{0, \pm 4QP, \pm 6QP, \pm 7QP, \ldots \pm 255QP\}$ $R_8 = \{0, \pm 4QP, \pm 5QP, \pm 7QP, \ldots \pm 255QP\}$ $R_9 = \{0, \pm 1QP, \pm 6QP, \pm 7QP, \ldots \pm 255QP\}$ $R_{10} = \{0, \pm 1QP, \pm 5QP, \pm 7QP, \ldots \pm 255QP\}$ $R_{11} = \{0, \pm 1QP, \pm 4QP, \pm 7QP, \ldots \pm 255QP\}$ $R_{12} = \{0, \pm 1QP, \pm 3QP, \pm 7QP, \ldots \pm 255QP\}$ $R_{13} = \{0, \pm 1QP, \pm 2QP, \pm 7QP, \ldots \pm 255QP\}$ $R_{14} = \{0, \pm 5QP, \pm 6QP, \pm 7QP, \ldots \pm 255QP\}$ The lowest two non-zero quantizer values are different in all 15 quantizers. By having multiple quantizer values for the lowest two non-zero level indexes of each quantizer a very efficient quantization is performed in the region where most of the input levels lie. In the adaptive quantization scheme of the present invention a different group of quantizers is defined by their quantizer values. The following group of quantizers $R_0$–$R_n$ is preferred in the present invention because it produces more reliable results and is more efficient:

$R_0 = \{0, \pm 3QP-\alpha, \pm 5QP-\alpha, \pm 7QP-\alpha \ldots \pm 255QP-\alpha\}$ $R_1 = \{0, \pm 3QP-\alpha, \pm 6QP-\alpha, \pm 7QP-\alpha \ldots \pm 255QP-\alpha\}$ $R_2 = \{0, \pm 3QP-\alpha, \pm 4QP-\alpha, \pm 7QP-\alpha, \ldots \pm 255QP-\alpha\}$ $R_3 = \{0, \pm 2QP-\alpha, \pm 6QP-\alpha, \pm 7QP-\alpha, \ldots \pm 255QP-\alpha\}$ $R_4 = \{0, \pm 2QP-\alpha, \pm 5QP-\alpha, \pm 7QP-\alpha, \ldots \pm 255QP-\alpha\}$ $R_5 = \{0, \pm 2QP-\alpha, \pm 4QP-\alpha, \pm 7QP-\alpha, \ldots \pm 255QP-\alpha\}$ $R_6 = \{0, \pm 2QP-\alpha, \pm 3QP-\alpha \pm 7QP-\alpha, \ldots \pm 255QP-\alpha\}$ $R_7 = \{0, \pm 4QP-\alpha, \pm 6QP-\alpha, \pm 7QP-\alpha, \ldots \pm 255QP-\alpha\}$ $R_8 = \{0, \pm 4QP-\alpha, \pm 5QP-\alpha, \pm 7QP-\alpha, \ldots \pm 255QP-\alpha\}$ $R_9 = \{0, \pm 1QP-\alpha, \pm 6QP-\alpha, \pm 7QP-\alpha, \ldots \pm 255QP-\alpha\}$ $R_{10} = \{0, \pm 1QP-\alpha, \pm 5QP-\alpha, \pm 7QP-\alpha \ldots \pm 255QP-\alpha\}$ $R_{11} = \{0, \pm 1QP-\alpha, \pm 4QP-\alpha, \pm 7QP-\alpha, \ldots \pm 255QP-\alpha\}$ $$R_{12} = \{0, \pm 1QP-\alpha, \pm 3QP-\alpha, \pm 7QP-\alpha, \ldots \pm 255QP-\alpha\}$$

$$R_{13} = \{0, \pm 1QP-\alpha, \pm 2QP-\alpha, \pm 7QP-\alpha, \ldots \pm 255QP-\alpha\}$$

$$R_{14} = \{0, \pm 5QP-\alpha, \pm 6QP-\alpha, \pm 7QP-\alpha, \ldots \pm 255QP-\alpha\}$$

where the quantization step size QP can be any number between 1 and 31. $\alpha=1$ if QP is an even number and $\alpha=0$ if QP is an odd number. The quantizer values of each quantizer are saved in an appropriate element of a one-dimensional Quantizer Value Array which corresponds to that quantizer, and can be retrieved using a quantizer value Level index.

While there may be any number of quantizers $R_0$-$R_n$, which differ from each other to any suitable degree, it has been found that significantly improved accuracy and bit rate can be achieved with quantizers that differ from each other at the lower multiples of QP. Accordingly, the above sets $R_0$-$R_{14}$ differ from each other at the two lowest non-zero multiples of QP, i.e., below 7QP and above -7QP, and the quantizer sets $R_0$-$R_{14}$ represent all possible sequences of multiples of QP between -7QP and 7QP. For multiples of QP greater than 6 and less than -6 the above sets are identical. Thus, during the quantization step 16, one of 15 possible quantizers $R_0$-$R_{14}$ is selected and used for the coding of a frame or a portion of a frame, and the quantizer $R_x$ may be changed for any frame or frame portion (i.e., 8×8 pel block or 16×16 pel block).

While the above example involves 15 quantizers $R_0$-$R_{14}$, derived by generating all possible sets which differ at absolute values of non-zero QP multiples below 7, a greater number of quantizers may be generated for sets that differ at higher absolute values of QP multiples. Similarly, a lower number of quantizers may be generated for sets that differ at lower absolute values of QP multiples. Furthermore, by experimentation, the quantizer sets that have the highest probability of being selected from the overall group of quantizers may be determined and the number of possible quantizers may be limited to those high probability sets. For example, by experimentation with the above quantizers $R_0$-$R_{14}$ and using a selection technique discussed below, it has been found that the quantizers $R_0$, $R_3$, $R_7$ and $R_{14}$ have the highest probability of selection.

In accordance with the preferred embodiment of the present invention, the selection of the appropriate quantizer $R_x$ will now be described with reference to FIG. 11.

First, the distortion and bit rate of each quantizer $R_x$ in the group $R_0$-$R_n$ is quantified by calculating an error value E for each quantizer (step 1100) based on a formula which takes into account both distortion and bit rate:

$$E = D + \lambda r$$

where D is a quantified value of the amount of distortion of the portion of the video image and r is a quantified bit rate which depends on the length of the bit code obtained in the coding step 18. The quantizer $R_x$ providing the lowest error value E is selected from the group $R_0$-$R_n$ (step 1110). Other formulas for calculating an error, for example, based only partially on the amount of distortion and bit rate factors, may also be used.

According to the above formula, the effect of the bit rate r on the overall error value E is weighted by a factor of $\lambda$. The value of $\lambda$ may be predetermined as a design parameter, based on the desired degree of the effect of the bit-rate on the selection of quantizers, or computed in real-time as the function of the bit-rate. Alternatively, the value $\lambda r$ may be pre-computed for different overall bit-rates and stored for access by a processor to avoid calculating this product for each input sample. A preferred $\lambda$ value of 2 has been found to provide superior results in many applications.

Thus, the quantization step 16 involves a calculation of the error value E, based on the amount of distortion and the bit rate provided by each quantizer in the selection group. Since this can result in a large number of calculations for systems employing a large number of quantizers, the quantizers may be limited to the quantizer sets that have been found to have the highest probability of selection, such as quantizer sets $R_0$, $R_3$, $R_7$ and $R_{14}$ in the above example.

An identification code, corresponding to the chosen $R_x$, must be provided to the receiver to identify which quantizer was selected and used during the quantization step 16 for each frame or frame portion. The number of bits required for the identification code is dependent on the number of quantizers in the selection group and for 15 quantizers defined above the identification code includes 4 bits, if the fixed-length code words are used to represent the identification code. If only four quantizers $R_0$, $R_3$, $R_7$ and $R_{14}$ are used, only two bits are needed. Alternatively, variable length code words may be used to represent quantizers (e.g., shorter length code words for representing more frequently chosen quantizers and longer length code words for less frequently chosen quantizers). Even with the inclusion of the quantizer identification code in the transmitted sequence for each coded frame or frame portion, an improvement in the overall bit rate, as well as a higher accuracy, was accomplished with the above described process over the standard methods.

Figure 11:
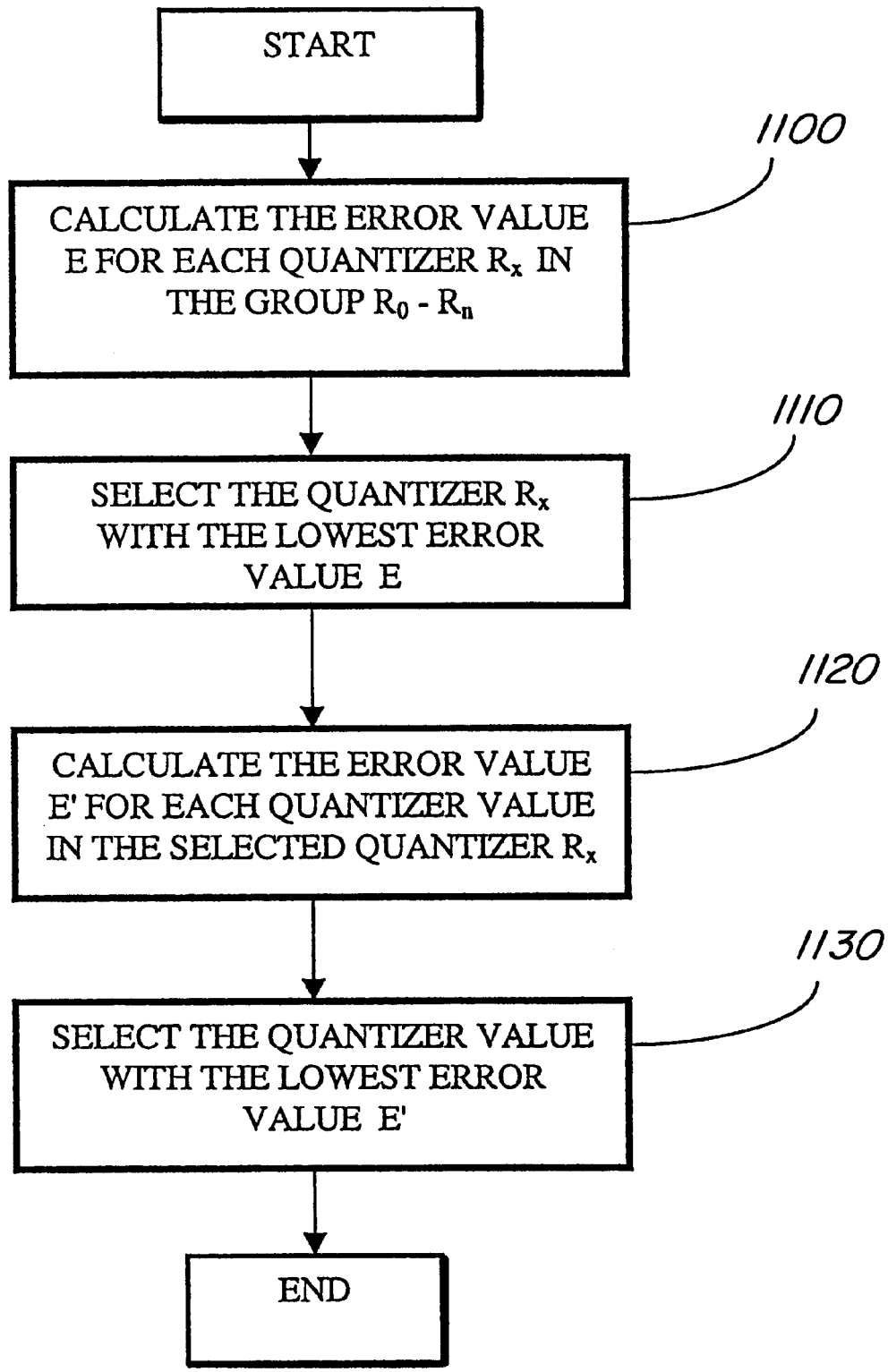
FIG. 11 is a flowchart for selecting a quantizer and a quantizer value in accordance with the preferred embodiment of the invention.

FIG. 11 shows addition steps for providing improvements in bit rate and accuracy by employing an error calculation during the selection of the quantizer value (QP multiple) within the selected quantizer. In particular, instead of selecting the QP multiple which is the closest, or closest and not greater, to the calculated Y' value, as discussed above, an error calculation is performed in which an error E' provided by each QP multiple is calculated (step 1120). As with the above-discussed error calculations, the error can be calculated from a formula which takes into account both the distortion and bit rate:

$$E' = D' + \lambda' r'$$

Where D' is a quantified value for distortion amont and r' is a quantified value for bit rate. The quantizer value with the lowest error E' is selected as the estimated Y' (step 1130). The value of $\lambda'$ may be predetermined as a design parameter, based on the desired effect of the bit-rate on the overall error value E', as discussed above, it may be computed in real-time as the function of the bit-rate, or $\lambda' r'$ may be pre-computed and stored. It has been found that a value of 60 for $\lambda'$ provides superior results in many applications.

The selection of a specific quantizer among the group of quantizers that gives the best combined distortion and bit rate characteristics can provide significant improvements in the overall accuracy and bit rate of the coding system. Furthermore, the selection of a particular quantizer value (QP multiple) within the selected quantizer, which provides the best combined distortion and bit rate characteristics, can provide further improvements in the overall accuracy and bit rate of the coding system.

Such improvements are shown using standard ITU-T testing sequences in the following examples. In Example 1 the quantizer set $R_0$ was used in accordance with the conventional H.263 standard. In Example 2 the quantizer group $R_0$, $R_3$, $R_7$ and $R_{14}$ was selected, and the selection was based on the above-discussed error equations and the indicated $\lambda$ and $\lambda'$ values. In Example 3 only the quantizer $R_0$ was used, but the selection of quantizer values within it was based on the above-discussed error E' calculation.

ITU-T "Carphone" Sequence (R=20 kbps) Examples

|  | Example 1 | Example 2 | Example 3 |
|---|---|---|---|
| $\lambda$ and $\lambda'$ | none standard H.263 | $\lambda = 2$ $\lambda' = 60$ | $\lambda = 0$ $\lambda' = 60$ |
| distortion | 30.77 dB | 31.60 dB | 31.04 dB |
| bit rate | 24.19 kbps | 24.30 kbps | 23.95 kbps |
| frame rate | 5.05 Hz | 5.30 Hz | 5.30 Hz |
| no. of frames | 20 frames | 21 frames | 21 frames |

ITU-T "Mother & Daughter" Sequence (R=20 kbps) Examples

|  | Example 1 | Example 2 | Example 3 |
|---|---|---|---|
| $\lambda$ and $\lambda'$ | none standard H.263 | $\lambda = 2$ $\lambda' = 60$ | $\lambda = 0$ $\lambda' = 60$ |
| distortion | 31.59 dB | 32.08 dB | 32.01 dB |
| bit rate | 23.47 kbps | 21.97 kbps | 23.17 kbps |
| frame rate | 5.25 Hz | 7.25 Hz | 5.50 Hz |
| no. of frames | 21 frames | 29 frames | 22 frames |

ITU-T "Susie" Sequence (R=20 kbps) Examples

|  | Example 1 | Example 2 | Example 3 |
|---|---|---|---|
| $\lambda$ and $\lambda'$ | none standard H.263 | $\lambda = 2$ $\lambda' = 42$ | $\lambda = 0$ $\lambda' = 42$ |
| distortion | 32.61 dB | 33.48 dB | 33.01 dB |
| bit rate | 22.95 kbps | 23.26 kbps | 22.94 kbps |
| frame rate | 5.10 Hz | 5.41 Hz | 5.21 Hz |
| no. of frames | 20 frames | 21 frames | 20 frames |

As is apparent from each of the above examples, better distortion (signal to noise ratio), bit rate and frame rate characteristics were achieved in Examples 2 and 3, as compared to Example 1 which uses the standard quantizer $R_0$. The examples show a gain in coding efficiency with an increase in the frame rate for the same quality of coding at the same bit rate, or an increase in quality and decrease in the bit rate for the same frame rate and a fixed quantization step size.

The present invention uses an adaptive entropy coding system and method in the coding step 18 of the adaptive quantization framework. In one preferred embodiment of the present invention a group of 3-D VLC tables is used for adaptive entropy coding (encoding and decoding) of each event, represented with a sequence (Level, Run, Last). The events correspond to pels with the highet probability of occurrence in the input signal and are stored in the VLC tables. Each 3-D VLC table also has an assigned bit code and a bit code sign for each event. The Level corresponds to the Level index to the quantizer corresponding to the quantizer value closest to the input signal pel value, the Run indicates number of zero valued pels before the current event and the non-zero value of Last indicates the last pel in a block which has non-zero value. VLC tables are determined by an off-line training procedure and each quantizer Rx has its own optimized VLC table in this preferred embodiment of the present invention.

In another preferred embodiment of the present invention only one, common, optimized VLC table is used for all quantizers. The lengths of the binary codes obtained in this embodiment, corresponding to the common VLC table, are presented in the tables of FIG. 6 and FIG. 7 for non-last and last events in a block.

Yet another preferred embodiment of the present invention is a coding processor which implements the adaptive entropy coding method of the present invention in the adaptive quantization framework. The coding processor could be a general computer or a special, dedicated computer. It is used to perform the encoding of a macroblock, which includes a determination of the quantizer $R_x$ closest to the input video signal in the quantization step 16. Once the quantizer is determined, the Level index for each quantizer value of each event is obtained as follows.

To get the actual quantizer values for a block of 8*8 pels, the most important, DC signal pel value is first considered. In the block with values represented in frequency domain, obtained in the DCT step 12, it is the top left element of the 8*8 block. At the encoder side, the level for this DC pel is generated by the equation Level=actual value of DC pel/8. Hence, on the decoder side, a reconstructed signal value for the DC pel is calculated as Rec=Level*8. For all other video signal input values, in the encoding process the Level index for each pel is obtained during the quantization step 16 using the above-mentioned equation for calculation of the error E', which takes into account both the distortion and bit rate:

$$E' = D' + \lambda' r'$$

The Level index represents the index to the one-dimensional Quantizer Value Array of the quantizer $R_x$, whose elements have the closest match to the actual pel values, together with the sign of the pel values. For example, if the pel value is 45 and the chosen quantizer is $R_2$, QP=16 and $\alpha=1$, than the Quantizer $R_2$ can be represented by the equation:

$$|R_2| = \{0, (3*16-1), (4*16-1), 7*16-1), \ldots, (255*16-1)\} =$$
$$\{0, 47, 63, 111, \ldots, 4079\}$$

In this case the Level index Level=1, because the input pel value of 45 is the closest to the first non-zero quantizer value 47 in the quantizer $R_2$.

In the coding step 18, Level=1 is coded together with the Run and Last value and the corresponding binary code, selected from the VLC table, is sent to the decoder together with the sign of the actual pel input value. In addition, for each macroblock a fixed-length binary identification code is transmitted to the decoder to indicate which of the quantizers is being used for decoding of the macroblock.

In the decoder, the first step consists of determining the used quantizer $R_x$ (here $R_2$) by decoding the fixed-length code. Then the actual reconstructed quantizer value of each pel is recovered by decoding the binary code of each event (Level, Run, Last) to get the quantizer value (here 47) from the quantizer $R_2$, which corresponds to the coded Level index (here 1), using the same 3-D VLC table corresponding to the quantizer used in the encoder side. The actual reconstructed signal value at the decoder is calculated as Rec= |Rec|* sign(Level). |Rec| is obtained from the reconstructing equation:|Rec|=R_{I}[|Level|] where R_{I}[.] represents the chosen quantizer, Level is the Level index, and |Rec| is the magnitude of the reconstructed value which corresponds to the quantizer value 47 in this example.

Figure 12:
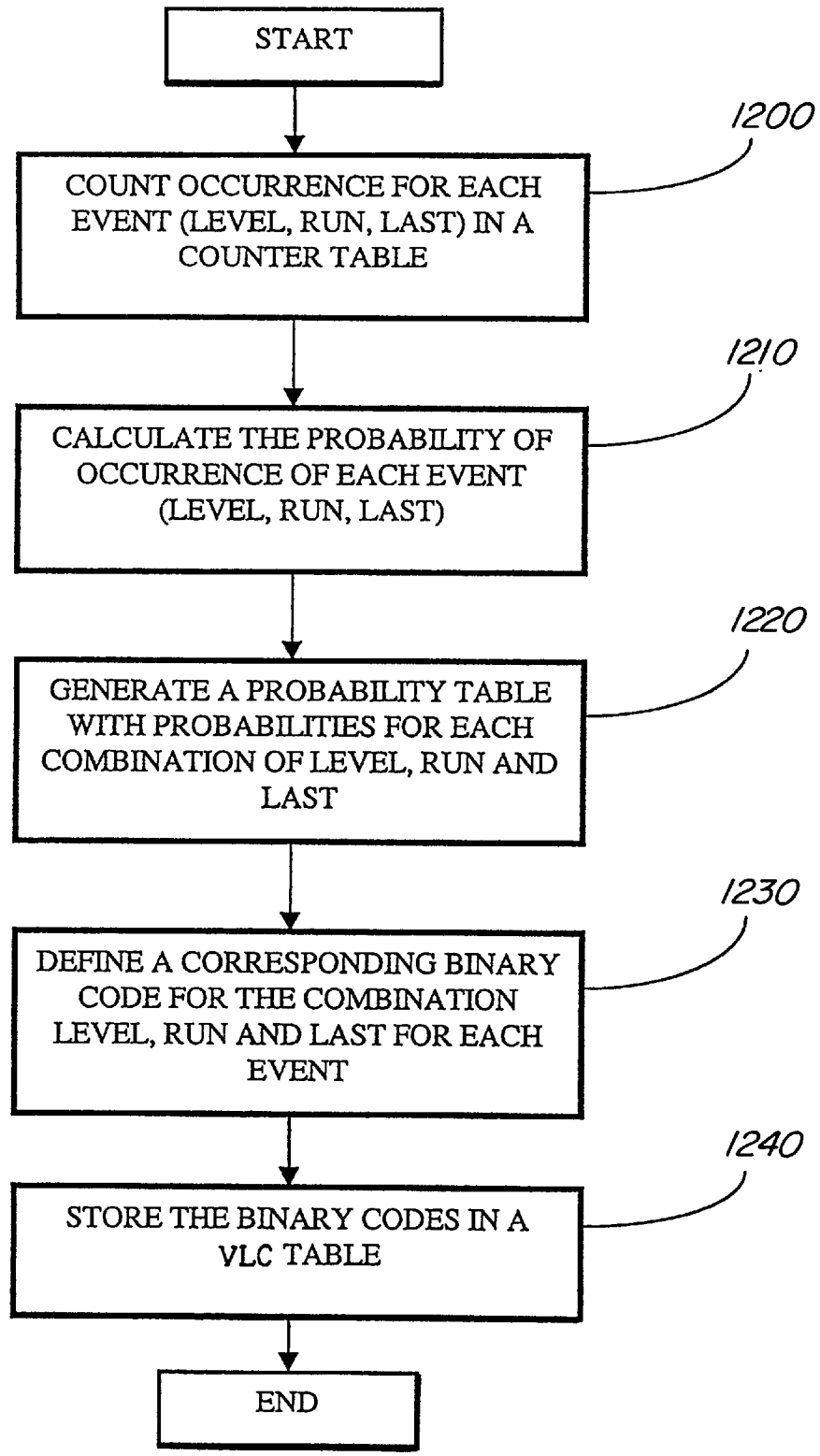
FIG. 12 is a flowchart for obtaining a VLC table in accordance with the preferred embodiment of the invention.

In the preferred embodiment of the present invention a training period procedure is used on training signals, which are similar to the video signals to be used with the coding system, to obtain the VLC table. The steps for obtaining the VLC table will be given with reference to FIG. 12. During the training procedure, adaptive quantization is used to find the best matching quantizer which produces the smallest error, and a count of occurrences for each event (Level, Run, Last) is kept in a counter table (step 1200) corresponding to the chosen quantizer. At the end of the training procedure, the probability of occurrence of each event (Level, Run, Last) in the training signal is calculated (step 1210). These probabilities are then used to generate a probability table, which has probabilities for each combination of Level, Run, and Last (step 1220). The information from the probability table is then used to define a corresponding binary code for the combination of Level, Run, and Last for each event (step 1230). The binary codes are stored in a VLC table (step 1240) so that the shortest binary code is assigned to the event which has the highest probability of occurrence. In the preferred embodiment which uses a separate VLC table for each quantizer, there are also multiple counter tables and probability tables, one of each for each quantizer.

The probability is calculated from the total number of occurrences of an event in the training signal. For the events that do not have high probability of occurrence, an Escape (Esc) code is entered in the tables. For less probable events, instead of defining coded values for Level, Run and Last and storing them in the VLC table, fixed-length codes for actual values for Level and Run of that event are sent to the decoder. This makes the procedure more efficient because it keeps the VLC table short. Since each Run can have a value between 0 and 63, it can be represented with six bits ($2^6$=64). Since each level can have a value between −127 and +127, it can be represented with eight bits ($2^8$=256). Therefore, fixed-length codes for an event are 14 bits long, which is much longer than the average length of binary codes chosen from the VLC table. When an Esc code is encountered in the decoder, it is treated as an actual value for Run and level until another Esc code is received.

The encoding of the actual video signals is accomplished in the variable length coding step 18 with the help of the VLC table defined during the training procedure. The pel values of the block are coded in the coding processor with a suitable entropy coding scheme such as Huffman Coding, Arithmetic Coding, Syntax Adaptive Arithmetic Coding or Ziv-Lempel Coding. Huffman coding is preferred because of its cost, accuracy and efficiency, because pel values can be coded with a relatively short binary code sequence, and because the number of zeroes in strings of zeros, which tend to occur toward the lower right corner of the quantized block, is included in the code for the next pel and these events do not need separate code. The efficiency of this method can be enhanced by coding the data for each pel in the zig-zag sequence, as mentioned above.

The method of the present invention utilizes joint probability distribution of three event parameters, Level, Run and Last, for each event, which further reduces the bit rate by reducing the average binary code length for each event. Since the binary codes for all events of a sequence are concatenated to form a stream of binary digits for storage or transmission, the correct decoding by the receiver requires that every combination of concatenated codes be uniquely decipherable. A sufficient condition is that the binary code satisfies the prefix rule, which requires that no binary code word may be the prefix of any other code word in the VLC table. Huffman code satisfies the prefix rule and it is very efficient because it performs within one bit/pel of the entropy. However, the present invention can also create each VLC table with a different entropy coding method, with or without Huffman's code.

The two tables presented in FIGS. 6 and 7 show the lengths of binary codes in the 3-D VLC table obtained by the training method of the present invention, when only one common VLC table is used for all quantizers. Each actual VLC code also contains a 1-bit sign value added at the end of the binary code for the combination of Level, Run and Last. The tables of FIGS. 6 and 7 have limited numbers of Runs and Levels; these numbers are determined by probabilities of the events and are kept as small as possible according to the accuracy needed. Therefore, in the table of FIG. 6 for events that are not last, twelve Level indexes and twenty-seven Runs are sufficient. In the table of FIG. 7 for last events, only three level indexes and forty-one Runs are needed, instead of 256 Level indexes and 64 Runs.

In an exemplary use of the method of the present invention, an 8×8 pel input block, given in FIG. 8, was quantized using the adaptive quantization scheme and quantizer $R_2$ was chosen from the group of 15 quantizers. The quantizer values for $R_2$ are defined as:

$$|R_2|=\{0, 3*QP-\alpha, 4*QP-\alpha, 7*QP-\alpha, \ldots, 255*QP-\alpha\}$$

where $\alpha$=1 if QP is an even number and otherwise is 0.

Although the quantization step size QP can change during the coding process for each portion of a block, as decided by the computer program with the coding algorithm, it is assumed in this example that for this particular block QP=16 and hence $\alpha$=1. The quantizer values are therefore:

$$|R_2| = \{0, (3*16-1), (4*16-1), 7*16-1), \ldots, (255*16-1)\} =$$

$$\{0, 47, 63, 111, \ldots, 4079\}$$

In quantizing the input block of FIG. 8 with the quantizer $R_2$, each input pel value is matched to the nearest quantizer value of the quantizer $R_2$ and the Level index of each matched quantizer value is saved in a quantized block which corresponds to $R_2$, shown in FIG. 9. This quantized block is then linearly scanned to get the event (Level, Run, Last) for each pel of this block, preferably in the zig-zag fashion, to obtain a block represented in FIG. 10. The more sophisticated method to obtain Level would be to use the above-mentioned equation for calculation of the error E' which takes into account both distortion and bit rate:

$$E'=D'+\lambda'r'$$

From the block represented in FIG. 10, it can be seen that there are only five non-zero events Event_1 to Event_5:

Event_1=[Level=3, Run=0, Last=0]
Event_2=[Level=1, Run=0, Last=0]
Event_3=[Level=2, Run=0, Last=0]
Event_4=[Level=2, Run=1, Last=0]
Event_5=[Level=1, Run=0, Last=1]

Run=1 in Event_4 shows that there is 1 zero before this event. Event_5 has Last=1 to show that this is the last non-zero event.

If this input block was the training block used during the training procedure, the counts for these five events in the counter table for quantizer $R_2$ will be incremented to show that five events had input pel values that may be quantized with $R_2$. By extending the training process over several training sequences, different quantizers will be chosen for different blocks or portions of blocks of the training sequence. For each of the blocks, according to the chosen quantizer, the appropriate counter table for each event will be updated and used in calculation of probability of the event. Since these probabilities are directly related to the binary codes in the VLC table, a different VLC table may be created for each quantizer. Because each binary code length corresponds to the probability that the particular event is quantizable with that quantizer, use of a separate VLC table for each quantizer produces binary codes with optimized length.

In the above example, a binary code for each of the 5 events is transmitted to the receiver for encoding, which also receives a 4-bit code for the quantizer used for the whole macroblock, in this example $R_2$. Therefore, the receiver selects the VLC binary code table corresponding to the quantizer used in the encoder in order to decode the Level index, Run and Late from the transmitted binary code.

The tables in the training process may be obtained in several different ways. One method of training and generating the probabilities, and eventually the VLC binary code tables, is to set the quantization step size QP to a fixed value used throughout the training process and to use the probabilities of different events, obtained for different quantizers, to generate the VLC tables for all quantizers. In another training method, the probabilities of different events for different quantizers are obtained by training at different QPs and the probabilities for each event at different QPs are averaged. Therefore, the training procedure may be chosen according to the input signal type. However, regardless of what the training procedure is, if the conditions during training are general enough, VLC tables may be obtained which are robust enough for a wide variety of environments.

Once the VLC tables for each of the quantizers are made in the training process, the choice of the appropriate VLC tables may be made by the same distortion criteria as used for choosing the quantizer, with the distortion equation $E=D+\lambda^* r$, which is calculated for each pel of the block, when the quantizer which results in the least cumulative weighted distortion for the whole macroblock is chosen. However, the choice of a quantizer, and hence the VLC table associated with that quantizer, can be made by using a different distortion equation. For example, by incorporating some other parameters, like QP, the distortion equation may be defined as:

$$E=D+\lambda^* f(QP)^* r$$

where f(QP) is a function of QP, like for example f(QP)= K/QP, where K is a constant determined by experimentation.

In one embodiment of the present invention a different VLC table is defined for each of the 15 quantizers. By having a separate VLC table for each quantizer an even more efficient compression of Levels and Runs can be accomplished by coding. With the method of the present invention a 10–25% gain in bit rates is achieved, which is considered substantial in the video coding field.

The adaptive entropy coding in adaptive quantization coding algorithm and the system of the present invention are believed to be especially applicable and useful in circuits used in low bit rate visual telephony for video conferencing, video codecs, set top boxes and the like. It is understood that the principles of this invention may also be applied in circuits used in non-adaptive environments and for higher bit rate video coding.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. An adaptive quantization method in a coding process for coding data values corresponding to each picture element (pel) of a portion of a video frame, the method comprising the steps of:

selecting, for each portion of a video frame, a quantizer set $R_x$ of quantizer values from a group of quantizer sets, wherein each quantizer value in each quantizer set is a multiple of a quantization coefficient QP and the quantizer sets are selected from the group consisting of:

$R_0=\{0,\pm 3QP-\alpha,\pm 5QP-\alpha,\pm 7QP-\alpha,\ldots,\pm 255QP-\alpha\};$ $R_1=\{0,\pm 3QP-\alpha,\pm 6QP-\alpha,\pm 7QP-\alpha,\ldots,\pm 255QP-\alpha\};$ $R_2=\{0,\pm 3QP-\alpha,\pm 4QP-\alpha,\pm 7QP-\alpha,\ldots,\pm 255QP-\alpha\};$ $R_3=\{0,\pm 2QP-\alpha,\pm 6QP-\alpha,\pm 7QP-\alpha,\ldots,\pm 255QP-\alpha\};$ $R_4=\{0,\pm 2QP-\alpha,\pm 5QP-\alpha,\pm 7QP-\alpha,\ldots,\pm 255QP-\alpha\};$ $R_5=\{0,\pm 2QP-\alpha,\pm 4QP-\alpha,\pm 7QP-\alpha,\ldots,\pm 255QP-\alpha\};$ $R_6=\{0,\pm 2QP-\alpha,\pm 3QP-\alpha,\pm 7QP-\alpha,\ldots,\pm 255QP-\alpha\};$ $R_7=\{0,\pm 4QP-\alpha,\pm 6QP-\alpha,\pm 7QP-\alpha,\ldots,\pm 255QP-\alpha\};$ $R_8=\{0,\pm 4QP-\alpha,\pm 5QP-\alpha,\pm 7QP-\alpha,\ldots,\pm 255QP-\alpha\};$ $R_9=\{0,\pm 1QP-\alpha,\pm 6QP-\alpha,\pm 7QP-\alpha,\ldots,\pm 255QP-\alpha\};$ $R_{10}=\{0,\pm 1QP-\alpha,\pm 5QP-\alpha,\pm 7QP-\alpha,\ldots,\pm 255QP-\alpha\};$ $R_{11}=\{0,\pm 1QP-\alpha,\pm 4QP-\alpha,\pm 7QP-\alpha,\ldots,\pm 255QP-\alpha\};$ $R_{12}=\{0,\pm 1QP-\alpha,\pm 3QP-\alpha,\pm 7QP-\alpha,\ldots,\pm 255QP-\alpha\};$ $R_{13}=\{0,\pm 1QP-\alpha,\pm 2QP-\alpha,\pm 7QP-\alpha,\ldots,\pm 255QP-\alpha\};$ $R_{14}=\{0,\pm 5QP-\alpha,\pm 6QP-\alpha,\pm 7QP-\alpha,\ldots,\pm 255QP-\alpha\};$ where the quantization set size QP is any number between 1 and 31 and $\alpha=1$ if QP is an even number and $\alpha=0$ if QP is an odd number; and correlating each data value with a quantizer value from the selected quantizer set $R_x$ to provide a quantized set of values corresponding to the pel data values.

2. An adaptive quantization method in a coding process for coding data values corresponding to each picture element (pel) of a portion of a video frame, the method comprising the steps of:

selecting, for each portion of a video frame, a quantizer set $R_x$ of quantizer values from a group of a plurality of quantizer sets, wherein each quantizer value in each quantizer set is a multiple of a quantization coefficient QP and the quantizer sets are selected from the group consisting of:

$R_0=\{0,\pm 3QP-\alpha,\pm 5QP-\alpha,\pm 7QP-\alpha,\ldots,\pm 255QP-\alpha\};$ $R_3=\{0,\pm 2QP-\alpha,\pm 6QP-\alpha,\pm 7QP-\alpha,\ldots,\pm 255QP-\alpha\};$ $R_7=\{0,\pm 4QP-\alpha,\pm 6QP-\alpha,\pm 7QP-\alpha,\ldots,\pm 255QP-\alpha\};$ $R_{14}=\{0,\pm 5QP-\alpha,\pm 6QP-\alpha,\pm 7QP-\alpha,\ldots,\pm 255QP-\alpha\};$ where the quantization set size QP is any number between 1 and 31 and $\alpha=1$ if QP is an even number and $\alpha=0$ if QP is an odd number; and correlating each data value with a quantizer value from the selected quantizer set $R_x$ to provide a quantized set of values corresponding to the pel data value.

3. A method of coding sampled video signal data values corresponding to picture elements (pels) of at least a portion of a video frame, comprising the steps of:

adaptively quantizing the sampled data values by correlating each sampled data value to a value selected from a predefined set $R_x$ of quantizer values which are multiples of a quantization coefficient QP, wherein said quantizer set is chosen from a group $R_0$–$R_n$ of quantizer sets based on a distortion and bit rate characteristics of each quantizer value in the set $R_x$;

determining and quantifying the distortion and bit rate characteristics provided by each quantizer set in the group $R_0$–$R_n$ for each portion of the video frame being coded;

calculating an error value E for each set in the group $R_0$–$R_n$ according to the formula: E=D+λf(QP)r, where D is a quantified distortion value for the portion of the video frame, r is a quantified bit rate value for the portion of the video frame, λ is a weighting value selected based on the desired effect of r on the overall E and f(QP) is a function of the quantization coefficient QP;

selecting the quantizer set $R_x$ that exhibits the lowest E value of the quantizer sets within the group $R_0$–$R_n$;

calculating an error value E' for each pel of said portion of the video frame and for each quantizer value in the quantizer set $R_x$ according to the formula: E'=D'+λ'r', where D' is a quantified distortion value for each pel, r' is a quantified bit rate value for each pel and λ' is a weighting value selected based on the desired effect of r' on the overall E';

selecting the quantizer value that exhibits the lowest E' value for the pel selecting at least one VLC table having an entry for each pel event with a high probability of occurrence; and coding the quantizer values with a variable length adaptive entropy coding method using the at least one VLC table.

4. A method of coding sampled video signal data values corresponding to picture elements (pels) of at least a portion of a video frame, comprising the steps of:

adaptively quantizing the sampled data values by correlating each sampled data value to a value selected from a predefined set $R_x$ of quantizer values which are multiples of a quantization coefficient QP, wherein said quantizer set is chosen from a group $R_0$–$R_n$ of quantizer sets based on the a distortion and bit rate characteristics of each quantizer value in the set $R_x$;

selecting at least one VLC table having an entry for each pel event with a high probability of occurrence, each of said pel event being defined by three event parameters: a Level, a Run, and a Last;

wherein the Level is a level index to the quantizer set $R_x$ corresponding to the selected quantizer value, the Run indicates a number of zero pels before the current event, and the Last indicates the last pel in a block which has a non-zero value;

coding the quantizer values with a variable length adaptive entropy coding method using the at least one VLC table;

wherein said coding step comprises a joint probability distribution binary coding step for simultaneous coding of all three event parameters to reduce an average binary code length for each event; and saving the binary code for each event with the sign of the actual pel input value in the VLC table.

5. The method as recited in claim 4, wherein the step selecting the at least one VLC table further comprising a training step performed on a training signal, comprising the following steps:

keeping a count of occurrences for each event from the training signal in at least one counter table;

calculating a probability of occurrence of each said event from the total number of occurrences of the event in the training signal;

generating at least one probability table to save probabilities for each combination of the parameters Level, Run and Last, to be used in the coding step, so that the shortest binary code is assigned to the event which has the highest probability of occurrence; and using an adaptive quantization step to find the best matching quantizer for each said event which produces the smallest error.

6. The method as recited in claim 5, wherein the training step is calculating probabilities for each said event using each quantizer set $R_x$ with all possible values of the quantization coefficient QP and the probabilities for each said event at different QPs are averaged.

7. The method as recited in claim 5, wherein the training step generates a plurality of VLC tables, a plurality of counter tables and a plurality of probability tables, one of each for each quantizer Rx.

8. The method as recited in claim 5, wherein the training step generates one common optimized VLC table used for all quantizers.

9. A method of coding sampled video signal data values corresponding to picture elements (pels) of at least a portion of a video frame, comprising the steps of:

adaptively quantizing the sampled data values by correlating each sampled data value to a value selected from a predefined set $R_x$ of quantizer values which are multiples of a quantization coefficient QP, wherein said quantizer set is chosen from a group of quantizer sets based on a distortion and bit rate characteristics of each quantizer value in the set $R_x$;

said group of quantizer sets consisting of:

$R_0=\{0,\pm 3QP-\alpha,\pm 5QP-\alpha,\pm 7QP-\alpha,\ldots,\pm 255QP-\alpha\};$ $R_1=\{0,\pm 3QP-\alpha,\pm 6QP-\alpha,\pm 7QP-\alpha,\ldots,\pm 255QP-\alpha\};$ $R_2=\{0,\pm 3QP-\alpha,\pm 4QP-\alpha,\pm 7QP-\alpha,\ldots,\pm 255QP-\alpha\};$ $R_3=\{0,\pm 2QP-\alpha,\pm 6QP-\alpha,\pm 7QP-\alpha,\ldots,\pm 255QP-\alpha\};$ $R_4=\{0,\pm 2QP-\alpha,\pm 5QP-\alpha,\pm 7QP-\alpha,\ldots,\pm 255QP-\alpha\};$ $R_5=\{0,\pm 2QP-\alpha,\pm 4QP-\alpha,\pm 7QP-\alpha,\ldots,\pm 255QP-\alpha\};$ $R_6=\{0,\pm 2QP-\alpha,\pm 3QP-\alpha,\pm 7QP-\alpha,\ldots,\pm 255QP-\alpha\};$ $R_7=\{0,\pm 4QP-\alpha,\pm 6QP-\alpha,\pm 7QP-\alpha,\ldots,\pm 255QP-\alpha\};$ $R_8=\{0,\pm 4QP-\alpha,\pm 5QP-\alpha,\pm 7QP-\alpha,\ldots,\pm 255QP-\alpha\};$ $R_9=\{0,\pm 1QP-\alpha,\pm 6QP-\alpha,\pm 7QP-\alpha,\ldots,\pm 255QP-\alpha\};$ $R_{10}=\{0,\pm 1QP-\alpha,\pm 5QP-\alpha,\pm 7QP-\alpha,\ldots,\pm 255QP-\alpha\};$ $R_{11}=\{0,\pm 1QP-\alpha,\pm 4QP-\alpha,\pm 7QP-\alpha,\ldots,\pm 255QP-\alpha\};$ $R_{12}=\{0,\pm 1QP-\alpha,\pm 3QP-\alpha,\pm 7QP-\alpha,\ldots,\pm 255QP-\alpha\};$ $R_{13}=\{0,\pm 1QP-\alpha,\pm 2QP-\alpha,\pm 7QP-\alpha,\ldots,\pm 255QP-\alpha\};$ $R_{14}=\{0,\pm 5QP-\alpha,\pm 6QP-\alpha,\pm 7QP-\alpha,\ldots,\pm 255QP-\alpha\};$ where the quantization set size QP is any number between 1 and 31, and α=1 if QP is an even number and α=0 if QP is an odd number;

selecting at least one VLC table having an entry for each pel event with a high probability of occurrence; and coding the quantizer values with a variable length adaptive entropy coding method using the at least one VLC table.

10. A method of coding sampled video signal data values corresponding to picture elements (pels) of at least a portion of a video frame, comprising the steps of:

adaptively quantizing the sampled data values by correlating each sampled data value to a value selected from a predefined set $R_x$ of quantizer values which are multiples of a quantization coefficient QP, wherein said quantizer set is chosen from a group of quantizer sets based on a distortion and bit rate characteristics of each quantizer value in the set $R_x$;

said group of quantizer sets consisting of:

$$R_0 = \{0, \pm 3QP - \alpha, \pm 5QP - \alpha, \pm 7QP - \alpha, \ldots, \pm 255QP - \alpha\};$$

$$R_3 = \{0, \pm 2QP - \alpha, \pm 6QP - \alpha, \pm 7QP - \alpha, \ldots, \pm 255QP - \alpha\};$$

$$R_7 = \{0, \pm 4QP - \alpha, \pm 6QP - \alpha, \pm 7QP - \alpha, \ldots, \pm 255QP - \alpha\};$$

$$R_{14} = \{0, \pm 5QP - \alpha, \pm 6QP - \alpha, \pm 7QP - \alpha, \ldots, \pm 255QP - \alpha\};$$

where the quantization set size QP is any number between 1 and 31, and $\alpha = 1$ if QP is an even number and $\alpha = 0$ if QP is an odd number;

selecting at least one VLC table having an entry for each pel event with a high probability of occurrence; and coding the quantizer values with a variable length adaptive entropy coding method using the at least one VLC table.

11. A system for coding sampled video signal data corresponding to picture elements (pels) of at least a portion of a video frame, comprising:

a storage means for storing a plurality of sets $R_0$–$R_n$ of quantizer values;

means for selecting, for each portion of the video frame being coded, a quantizer set $R_x$ of quantizer values, which are multiples of a quantization coefficient QP, from a group of sets $R_0$–$R_n$, dependent on a quantified distortion and bit rate of the selected set $R_x$;

said selecting means comprising:

means for calculating an error E for each portion of the video frame being coded and for each quantizer set in the group $R_0$–$R_n$, according to the formula: $E = D + \lambda f(QP)r$, where D is a quantified distortion value for the portion of the video frame, r is a quantified bit rate value for the portion of the video frame, $\lambda$ is a weighting value selected based on the desired effect of r on the overall E and f(QP) is a function of the quantization coefficient QP; and means for selecting the quantizer $R_x$ that exhibits the lowest E value of the quantizer sets within the group $R_0$–$R_n$;

means for correlating each video signal data value for each frame portion being coded with a quantizer value from the quantizer set $R_x$ selected for that frame portion;

said correlating means comprising:

means for determining and quantifying the distortion and bit rate characteristics of each quantizer value within the set $R_x$; and means for selecting the quantizer value based on the distortion and bit rate characteristics provided by each quantizer value in the set $R_x$;

means for selecting at least one VLC table having an entry for each pel event with a high probability of occurrence; and means for encoding the quantizer values with a variable length adaptive entropy coding method using the at least one VLC table.

12. A system for coding sampled video signal data corresponding to picture elements (pels) of at least a portion of a video frame, comprising:

a storage means for storing a plurality of sets $R_0$–$R_n$ of quantizer values;

means for selecting, for each portion of the video frame being coded, a quantizer set $R_x$ of quantizer values, which are multiples of a quantization coefficient QP, from a group of sets $R_0$–$R_n$, dependent on a quantified distortion and bit rate of the selected set $R_x$;

means for correlating each video signal data value for each frame portion being coded with a quantizer value from the quantizer set $R_x$ selected for that frame portion;

means for selecting at least one VLC table having an entry for each pel event with a high probability of occurrence; each of said pel event being defined by three event parameters: a Level, a Run, and a Last;

wherein the Level is a level index to the quantizer set $R_x$ corresponding to the selected quantizer value, the Run indicates a number of zero pels before the current event, and the Last indicates the last pel in a block which has a non-zero value;

means for encoding the quantizer values with a variable length adaptive entropy coding method using the at least one VLC table; and wherein said variable length adaptive entropy coding method comprises a joint probability distribution binary coding method for simultaneous coding of all three event parameters to reduce an average binary code length for each event, and the binary code for each event is saved with the sign of the actual pel input value in the VLC table.

13. A system for coding sampled video signal data corresponding to picture elements (pels) of at least a portion of a video frame, comprising:

a storage means for storing a plurality of sets $R_0$–$R_n$ of quantizer values;

means for selecting, for each portion of the video frame being coded, a quantizer set $R_x$ of quantizer values, which are multiples of a quantization coefficient QP, from a group of sets $R_0$–$R_n$, dependent on a quantified distortion and bit rate of the selected set $R_x$;

means for correlating each video signal data value for each frame portion being coded with a quantizer value from the quantizer set $R_x$ selected for that frame portion;

means for selecting at least one VLC table having an entry for each pel event with a high probability of occurrence; each of said pel event being defined by three event parameters: a Level, a Run, and a Last;

wherein the Level is a level index to the quantizer set $R_x$ corresponding to the selected quantizer value, the Run indicates a number of zero pels before the current event, and the Last indicates the last pel in a block which has a non-zero value;

means for encoding the quantizer values with a variable length adaptive entropy coding method using the at least one VLC table; and means for determining the at least one VLC table in a training procedure using a training signal, comprising:

means for keeping a count of occurrences for each event from the training signal in at least one counter table;

means for calculating a probability of occurrences of each said event from a total number of occurrences of the event in the training signal; and means for generating at least one probability table to save probabilities for each combination of the three event parameters to be used in the encoding means so that the shortest binary code is assigned to the event which has the highest probability of occurrence.

14. The system as recited in claim 13, wherein the training procedure is calculating probabilities for each said event using each quantizer set $R_x$ with all possible values of the quantization coefficient QP and the probabilities for each said event at different QPs are averaged.

15. The system as recited in claim 13, wherein the training procedure generates a plurality of VLC tables, a plurality of counter tables and a plurality of probability tables, one of each for each quantizer Rx.

16. The system as recited in claim 13, wherein the training procedure generates one common optimized VLC table used for all quantizers wherein length of the binary codes from the VLC table are represented in tables of FIGS. 6 and 7.

17. A system for coding sampled video signal data corresponding to picture elements (pels) of at least a portion of a video frame, comprising:

a storage means for storing a plurality of sets of quantizer values;

means for selecting, for each portion of the video frame being coded, a quantizer set $R_x$ of quantizer values, which are multiples of a quantization coefficient QP, from a group of quantizer sets, dependent on a quantified distortion and bit rate of the selected set $R_x$;

said group of quantizer sets consisting of:

$R_0 = \{0, \pm 3QP-\alpha, \pm 5QP-\alpha, \pm 7QP-\alpha, \ldots, \pm 255QP-\alpha\};$ $R_1 = \{0, \pm 3QP-\alpha, \pm 6QP-\alpha, \pm 7QP-\alpha, \ldots, \pm 255QP-\alpha\};$ $R_2 = \{0, \pm 3QP-\alpha, \pm 4QP-\alpha, \pm 7QP-\alpha, \ldots, \pm 255QP-\alpha\};$ $R_3 = \{0, \pm 2QP-\alpha, \pm 6QP-\alpha, \pm 7QP-\alpha, \ldots, \pm 255QP-\alpha\};$ $R_4 = \{0, \pm 2QP-\alpha, \pm 5QP-\alpha, \pm 7QP-\alpha, \ldots, \pm 255QP-\alpha\};$ $R_5 = \{0, \pm 2QP-\alpha, \pm 4QP-\alpha, \pm 7QP-\alpha, \ldots, \pm 255QP-\alpha\};$ $R_6 = \{0, \pm 2QP-\alpha, \pm 3QP-\alpha, \pm 7QP-\alpha, \ldots, \pm 255QP-\alpha\};$ $R_7 = \{0, \pm 4QP-\alpha, \pm 6QP-\alpha, \pm 7QP-\alpha, \ldots, \pm 255QP-\alpha\};$ $R_8 = \{0, \pm 4QP-\alpha, \pm 5QP-\alpha, \pm 7QP-\alpha, \ldots, \pm 255QP-\alpha\};$ $R_9 = \{0, \pm 1QP-\alpha, \pm 6QP-\alpha, \pm 7QP-\alpha, \ldots, \pm 255QP-\alpha\};$ $R_{10} = \{0, \pm 1QP-\alpha, \pm 5QP-\alpha, \pm 7QP-\alpha, \ldots, \pm 255QP-\alpha\};$ $R_{11} = \{0, \pm 1QP-\alpha, \pm 4QP-\alpha, \pm 7QP-\alpha, \ldots, \pm 255QP-\alpha\};$ $R_{12} = \{0, \pm 1QP-\alpha, \pm 3QP-\alpha, \pm 7QP-\alpha, \ldots, \pm 255QP-\alpha\};$ $R_{13} = \{0, \pm 1QP-\alpha, \pm 2QP-\alpha, \pm 7QP-\alpha, \ldots, \pm 255QP-\alpha\};$ $R_{14} = \{0, \pm 5QP-\alpha, \pm 6QP-\alpha, \pm 7QP-\alpha, \ldots, \pm 255QP-\alpha\};$ where the quantization set size QP is any number between 1 and 31, and $\alpha=1$ if QP is an even number and $\alpha=0$ if QP is an odd number;

means for correlating each video signal data value for each frame portion being coded with a quantizer value from the quantizer set $R_x$ selected for that frame portion;

means for selecting at least one VLC table having an entry for each pel event with a high probability of occurrence; and means for encoding the quantizer values with a variable length adaptive entropy coding method using the at least one VLC table.

18. A system for coding sampled video signal data values corresponding to picture elements (pels) of at least a portion of a video frame, comprising the steps of:

a storage means for storing a plurality of sets of quantizer values;

means for selecting, for each portion of the video frame being coded, a quantizer set $R_x$ of quantizer values, which are multiples of a quantization coefficient QP, from a group of quantizer sets, dependent on a quantified distortion and bit rate of the selected set $R_x$;

said group of quantizer sets consisting of:

$R_0 = \{0, \pm 3QP-\alpha, \pm 5QP-\alpha, \pm 7QP-\alpha, \ldots, \pm 255QP-\alpha\};$ $R_3 = \{0, \pm 2QP-\alpha, \pm 6QP-\alpha, \pm 7QP-\alpha, \ldots, \pm 255QP-\alpha\};$ $R_7 = \{0, \pm 4QP-\alpha, \pm 6QP-\alpha, \pm 7QP-\alpha, \ldots, \pm 255QP-\alpha\};$ $R_{14} = \{0, \pm 5QP-\alpha, \pm 6QP-\alpha, \pm 7QP-\alpha, \ldots, \pm 255QP-\alpha\};$ where the quantization set size QP is any number between 1 and 31, and $\alpha=1$ if QP is an even number and $\alpha=0$ if QP is an odd number;

means for correlating each video signal data value for each frame portion being coded with a quantizer value from the quantizer set $R_x$ selected for that frame portion;

means for selecting at least one VLC table having an entry for each pel event with a high probability of occurrence; and means for coding the quantizer values with a variable length adaptive entropy coding method using the at least one VLC table.

* * * * *